US012775489B2

(12) United States Patent
Gu

(10) Patent No.: US 12,775,489 B2
(45) Date of Patent: Oct. 27, 2026

(54) MULTI-CORE PROCESSOR TASK SCHEDULING METHOD, AND DEVICE AND STORAGE MEDIUM

(71) Applicant: Cloud Intelligence Assets Holding (Singapore) Private Limited, Singapore (SG)

(72) Inventor: Liangzeng Gu, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 553 days.

(21) Appl. No.: 18/547,249

(22) PCT Filed: Feb. 22, 2022

(86) PCT No.: PCT/CN2022/077211

§ 371 (c)(1),
(2) Date: Aug. 21, 2023

(87) PCT Pub. No.: WO2022/179486

PCT Pub. Date: Sep. 1, 2022

(65) Prior Publication Data

US 2024/0160474 A1 May 16, 2024

(30) Foreign Application Priority Data

Feb. 23, 2021 (CN) ........................ 202110201247.X

(51) Int. Cl.
*G06F 9/48* (2006.01)
*G06F 9/50* (2006.01)

(52) U.S. Cl.
CPC .......... *G06F 9/4881* (2013.01); *G06F 9/4812* (2013.01); *G06F 9/5033* (2013.01); *G06F 9/5038* (2013.01); *G06F 9/5027* (2013.01)

(58) Field of Classification Search
None
See application file for complete search history.

(56) References Cited

U.S. PATENT DOCUMENTS

| | | | | |
|---|---|---|---|---|
| 9,298,504 | B1 * | 3/2016 | Vincent | G06F 9/505 |
| 2013/0117757 | A1 | 5/2013 | Jung | |
| 2019/0087224 | A1 * | 3/2019 | Vrind | G06F 9/4818 |

FOREIGN PATENT DOCUMENTS

| | | | |
|---|---|---|---|
| CN | 105487919 | A | 4/2016 |
| CN | 107545351 | A | 1/2018 |

(Continued)

OTHER PUBLICATIONS

English Translation of First Chinese Office Action, Application No. 202110201247.X, Jan. 15, 2025, 6 pages.

(Continued)

*Primary Examiner* — Qing Yuan Wu
(74) *Attorney, Agent, or Firm* — Osha Bergman Watanabe & Burton LLP

(57) ABSTRACT

A multi-core processor task scheduling method and apparatus, and a device and storage medium are disclosed. The method includes: acquiring a target task to be executed and selecting a target processor from a multi-core processor on the basis of attribute information of the target task. The attribute information includes binding relationship information and priority information. The binding relationship information is used for describing whether the target task needs to be run on a processor having a binding relationship, and the priority information is used for describing a priority of the target task. The method includes scheduling the target task to the target processor and running the target task on the target processor. The present application solves the technical problem of existing multi-core scheduling algorithms being unable to accurately determine a target processor for running a task to be executed.

17 Claims, 4 Drawing Sheets

(56) References Cited

FOREIGN PATENT DOCUMENTS

| | | | |
|---|---|---|---|
| CN | 108769254 | A | 11/2018 |
| CN | 109522101 | A | 3/2019 |
| CN | 111488210 | A | 8/2020 |

OTHER PUBLICATIONS

English Translation of the International Search Report, Application No. PCT/CN2022/077211, Sep. 1, 2022, p. 3.

* cited by examiner

MULTI-CORE PROCESSOR TASK SCHEDULING METHOD, AND DEVICE AND STORAGE MEDIUM

CROSS-REFERENCE TO RELATED APPLICATIONS

The present invention is filed under 35 U.S.C. § 371 as the U.S. national phase of International Patent Application No. PCT/CN2022/077211, filed Feb. 22, 2022, which designated the United States and which claims the benefit of Chinese Invention Patent Application No. 202110201247.X, filed Feb. 23, 2021, which is hereby incorporated by reference in its entirety.

The present application claims priority to Chinese patent application No. 202110201247.X, filed on Feb. 23, 2021 and entitled "MULTI-CORE PROCESSOR TASK SCHEDULING METHOD AND APPARATUS, AND DEVICE AND STORAGE MEDIUM", which is incorporated herein by reference in its entirety.

TECHNICAL FIELD

The present application relates to the field of processor task scheduling, and in particular to a multi-core processor task scheduling method, apparatus and device, and a storage medium.

BACKGROUND

On a machine in which a multi-core processor is running, each processor itself has a cache region, and data used for executing a task is stored in the cache region. If a task of this processor is scheduled to another processor by an operating system, since the cache region of the other processor does not have such data, it is necessary to load data from a memory or a hard disk into the cache region, and thus the cache memory hit rate becomes low, thereby affecting the performance of the system.

For example, multiprocessor task scheduling algorithms provided in existing technologies all have a situation that tasks are frequently scheduled among multiple processors, which increases the number of times of unnecessary task scheduling. It is impossible to accurately determine that a new task to be executed will be run on which processor, resulting in the new task having poor affinity for the cache memory.

For the above problem, an effective solution has not yet been proposed.

SUMMARY

Embodiments of the present application provide a multi-core processor task scheduling method, apparatus and device, and a storage medium, in order to at least solve the technical problem that the existing multi-core scheduling algorithms cannot accurately determine a target processor for running a task to be executed.

According to one aspect of the embodiments of the present application, a multi-core processor task scheduling method is provided, including: acquiring a target task to be executed; selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; scheduling the target task to the target processor; and running the target task on the target processor.

According to another aspect of the embodiments of the present application, a multi-core processor task scheduling apparatus is also provided, including: an acquisition module, configured for acquiring a target task to be executed; a selection module, configured for selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; a scheduling module, configured for scheduling the target task to the target processor; and a running module, configured for running the target task on the target processor.

According to another aspect of the embodiments of the present application, a non-volatile storage medium is provided, including a stored program, wherein the program, when run, controls a device where the non-volatile storage medium is located to implement any one of the above multi-core processor task scheduling methods.

According to another aspect of the embodiments of the present application, a multi-core processor task scheduling device is also provided, including: a processor; and a memory, connected to the processor and configured for providing the processor with instructions to perform the following processing steps: acquiring a target task to be executed; selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; scheduling the target task to the target processor; and running the target task on the target processor.

In the embodiments of the present application, a target task to be executed is acquired; a target processor is selected from a multi-core processor based on attribute information of the target task, wherein the attribute information includes binding relationship information and priority information, the binding relationship information is used for describing whether the target task needs to be run on a processor having a binding relationship, and the priority information is used for describing a priority of the target task; the target task is scheduled to the target processor; and the target task is run on the target processor.

It is easy to notice that in the embodiments of the present application, all processors in the multi-core processor are regarded as the available overall resources that can be scheduled collectively, and the target processor is selected from the multi-core processor based on the binding relationship information and the priority information of the target task to be executed, and the target task is merely scheduled to the target processor, to run the target task on the target processor. Thus, the embodiments of the present application achieve the purpose of accurately determining the target processor for running the task to be executed, thereby achieving the technical effect of reducing the number of times of task scheduling of the multi-core processor and improving the overall performance of the system, and then thereby solving the technical problem that the existing multi-core scheduling algorithms cannot accurately determine a target processor for running a task to be executed.

BRIEF DESCRIPTION OF THE DRAWINGS

The drawings described herein are used to provide a further understanding of the present application, and constitute a part of the present application. The illustrative embodiments of the present application and descriptions thereof are used to explain the present application, and do not constitute an improper limitation of the present application. In the drawings.

DETAILED DESCRIPTION

Figure 1:
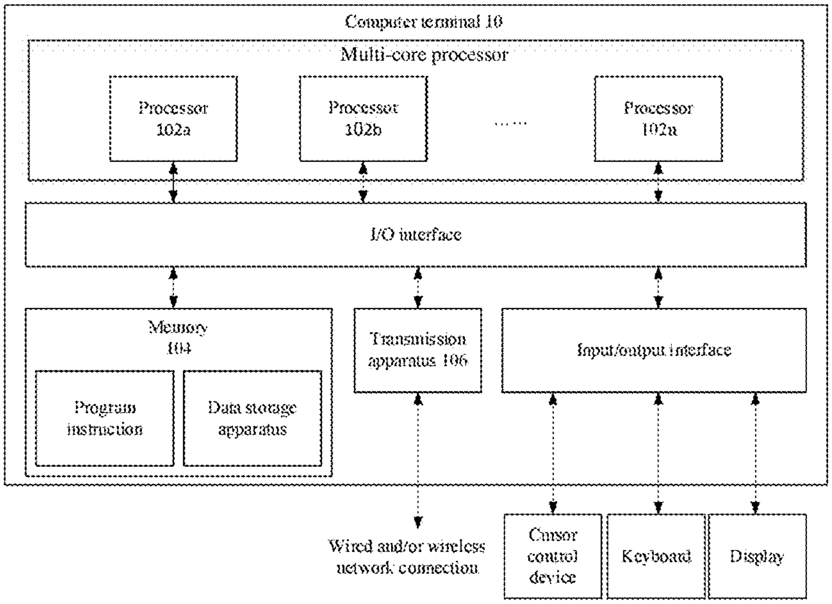
FIG. 1 shows a block diagram of the hardware structure of a computer terminal (or a mobile device) for implementing a multi-core processor task scheduling method.

In order to enable those of ordinary skill in the art to better understand the solution of the present application, the technical solutions of the embodiments of the present application will be described clearly and completely below in combination with the drawings corresponding to the embodiments of the present application. Obviously, the described embodiments are only some of the embodiments of the present application, rather than all embodiments. Based on the embodiments of the present application, all other embodiments obtained by those skilled in the art without any creative labors should fall within the scope of the protection of the present application.

It should be explained that terms such as “first”, “second”, etc. in the description and claims of the present application as well as in the above drawings are used to distinguish similar objects, instead of describing a specific order or sequence. It should be understood that data used in this way may be exchanged under appropriate circumstances, so that the embodiments of the present application described herein may be implemented in an order other than those illustrated or described herein. In addition, terms such as “including” and “having” as well as any variants thereof are intended to cover the nonexclusive inclusion. For example, processes, methods, systems, products, or devices containing a series of steps or units do not need to be limited to those steps or units clearly listed, but may include other steps or units, which are not clearly listed or are inherent to those processes, methods, products, or devices.

First, some nouns or terms appearing in the process of describing the embodiments of the present application are applicable to the following explanations.

Multi-core processor: refers to the integration of two or more complete computing engines (cores) in one processor. At this time, the processor can support multiple processors on a system bus, and all bus control signals and command signals are provided by the bus controller. The processors may include, but are not limited to: central processing unit (CPU), graphics processing unit (GPU), digital signal processing (DSP) chip, microprocessor (MCU), programmable logic device (FPGA), neural network processor (NPU), tensor processor (TPU), artificial intelligence (AI) type processor, and other processing devices. Optional embodiments mentioned below will be described by taking a CPU as an example, but this does not constitute an undue limitation to the present application, and these optional embodiments may also be applied to other types of processors.

Task scheduling: refers to a process of selecting a target task to run on a processor.

Inter-processor interrupt: refers to a procedure in which the processor that is currently running a task, in a multi-core processor, sends an interrupt signal to a target processor, to trigger the execution of task schedule on the target processor.

Ready queue: refers to a task queue waiting to be executed by a processor.

Task-bound processor: refers to that a specified task is only run on a certain processor.

A first kind of multiprocessor task scheduling algorithm provided in the prior art usually has only one global ready queue. Before a CPU executes scheduling, the CPU will send inter-processor interrupts to other CPUs, to trigger the execution of schedulers on the other CPUs. Every time the scheduling is executed, all CPUs need to execute the schedulers. There are the following disadvantages: tasks will be frequently scheduled among multiple CPUs, which increases the number of times of unnecessary task scheduling; it does not consider which core the new task was running on before, and the CPU cache affinity is poor.

A second kind of multiprocessor task scheduling algorithm provided in the prior art also has one global ready queue, and adds a ready queue having a task with core-binding relationship for each core. If the ready task is a core-binding task, only the corresponding CPU will be selected, but if the corresponding CPU is bound, no inter-processor interrupt will be sent. If the ready task is not a core-binding task, all other cores other than itself will be selected. There are the following disadvantages: after inter-processor interrupts are sent to all other cores, all the cores trigger a scheduling, which additionally increases the number of times of unnecessary scheduling; it does not consider which core the new task was running on before, and the CPU cache affinity is poor.

In a third kind of multiprocessor task scheduling algorithm provided in the prior art, each CPU corresponds to a ready task queue, and load balancing is performed regularly; a task migration thread is added for task migration between respective CPUs. There are the following disadvantages: each CPU corresponds to a ready task queue, which is prone to task imbalance on the CPUs, and thus an additional load balancing algorithm is implemented; and in order to support various complex CPU topologies, the complexity of codes is increased.

From the above analysis, it can be seen that for the multiprocessor task scheduling algorithms provided in the prior art, an inter-processor interrupt is sent to other CPUs during each scheduling, to trigger the other CPUs to execute the scheduler together. Since the switching of task is uncontrollable, there will be a problem that tasks are switched frequently among different CPUs, resulting in multiple times of unnecessary scheduling. Meanwhile, the CPU cache hit rate is low, which affects the system performance.

In addition, the multiprocessor task scheduling algorithms provided in the prior art cannot solve the technical problem of accurately determining that a new task to be executed will be run on which CPU. In order to solve the above technical problem, the inventor of the present application provides a multi-core processor task scheduling method, in which all CPUs in a multi-core processor are regarded as the available overall resources that can be scheduled collectively, which improves the affinity of CPU cache, reduces the number of times of scheduling and improves the system performance. Moreover, compared with the above-mentioned Linux scheduling algorithm, the embodiments of the present application are more concise and clearer, and are more applicable to Internet of Things (IOT) devices.

First Embodiment

According to an embodiment of the present application, a method embodiment of a multi-core processor task scheduling method is provided. It should be explained that steps shown in a flow chart in the drawings may be executed in a computer system including such as a set of computer executable instructions. Moreover, the logical order is shown in the flow chart, but in some cases, the steps shown or described may be executed in a different order than the order described herein.

The method embodiment provided by the first embodiment of the present application may be executed in a mobile terminal, a computer terminal or a similar computing device. FIG. 1 shows a block diagram of the hardware structure of a computer terminal (or a mobile device) for implementing a multi-core processor task scheduling method. As shown in FIG. 1, the computer terminal 10 (or the mobile device 10) may include one or more processors 102 (shown by 102*a*, 102*b*, . . . , 102*n* in the figure), a memory 104 for storing data, and a transmission module 106 for communication function. In addition, it may also include: a display, an input/output interface (I/O interface), a universal serial bus (USB) port (which may be included as one of ports of the BUS bus), a network interface, a power supply and/or a camera. Those of ordinary skill in the art may understand that the structure shown in FIG. 1 is only an example, and it does not limit the structure of the above electronic apparatus. For example, the computer terminal 10 may also include more or less components shown in FIG. 1, or have a configuration different from that as shown in FIG. 1.

It should be noted that the one or more processors 102 and/or other data processing circuits described above may generally be referred to herein as "data processing circuit". The data processing circuit may be implemented in whole or in part as software, hardware, firmware or other arbitrary combinations. In addition, the data processing circuit may be a single independent processing module, or be fully or partially integrated into any of other elements in the computer terminal 10 (or the mobile device). As mentioned in the embodiment of the present application, the data processing circuit is controlled as a processor (for example, the selection of a terminal path of a variable resistance connected to an interface).

The memory 104 may be used to store a software program and a module of an application software, such as program instructions/data storage apparatus corresponding to the multi-core processor task scheduling method according to the embodiment of the present application. The processor 102 implements various functional applications and data processing by running the software program and the module stored in the memory 104, i.e., implementing the above multi-core processor task scheduling method. The memory 104 may include a high-speed random memory, and may also include a non-volatile memory, such as one or more magnetic storage devices, a flash memory, or other non-volatile solid-state memories. In some examples, the memory 104 may further include memories remotely set relative to the processor 102, and these remote memories may be connected to the computer terminal 10 via a network. The examples of the above network include, but are not limited to, the Internet, intranets, local area networks, mobile communication networks, and combinations thereof.

The transmission apparatus 106 is configured to receive or send data via a network. The specific example of the above network may include a wireless network provided by a communication supplier of the computer terminal 10. In an instance, the transmission apparatus 106 includes a network adapter (Network Interface Controller, NIC for short), which may be connected with other network devices through a base station, to communicate with the Internet. In an instance, the transmission apparatus 106 may be a Radio Frequency (RF) module, which is configured to communicate with the Internet in a wireless manner.

The display may, for example, be a liquid crystal display (LCD) with a touch screen. The liquid crystal display may enable a user to interact with the user interface of the computer terminal 10 (or the mobile device).

Figure 2:
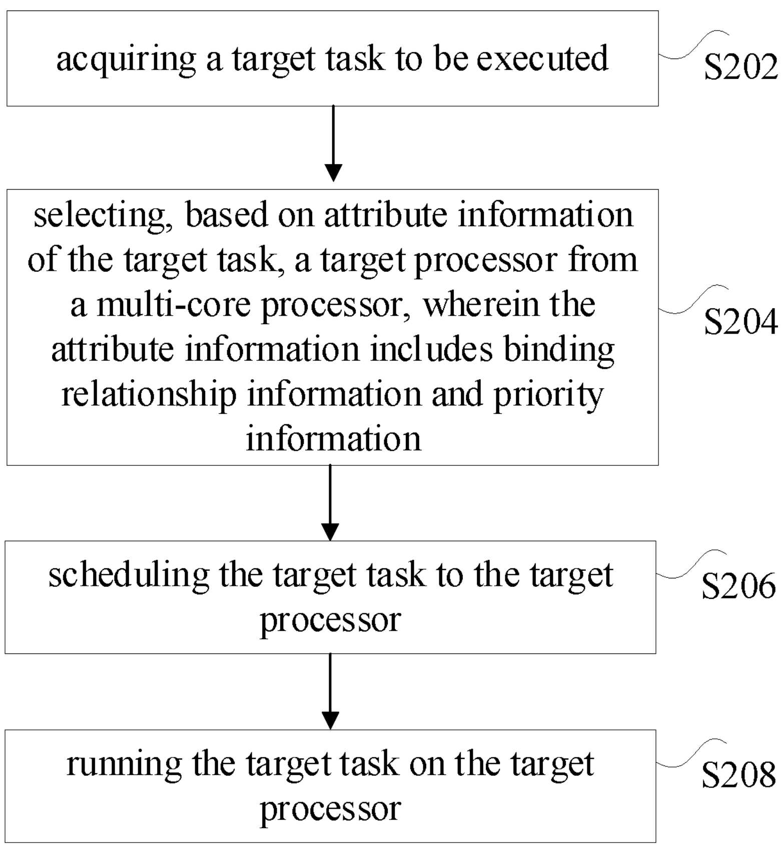
FIG. 2 is a flow chart of a multi-core processor task scheduling method according to an embodiment of the present application.

Under the above operating environment, the present application provides a multi-core processor task scheduling method as shown in FIG. 2. FIG. 2 is a flow chart of a multi-core processor task scheduling method according to an embodiment of the present application. As shown in FIG. 2, the above-mentioned multi-core processor task scheduling method includes following steps.

Step S202, acquiring a target task to be executed;

Step S204, selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task;

Step S206, scheduling the target task to the target processor; and

Step S208, running the target task on the target processor.

In the embodiment of the present application, a target task to be executed is acquired; a target processor is selected from a multi-core processor based on attribute information of the target task, wherein the attribute information includes binding relationship information and priority information, the binding relationship information is used for describing whether the target task needs to be run on a processor having a binding relationship, and the priority information is used for describing a priority of the target task; the target task is scheduled to the target processor; and the target task is run on the target processor.

It is easy to notice that in the embodiments of the present application, all processors in the multi-core processor are regarded as the available overall resources that can be scheduled collectively, and the target processor is selected from the multi-core processor based on the binding relationship information and the priority information of the target task to be executed, and the target task is merely scheduled to the target processor, to run the target task on the target processor. Thus, the embodiments of the present application achieve the purpose of accurately determining the target processor for running the task to be executed, thereby achieving the technical effect of reducing the number of times of task scheduling of the multi-core processor and improving the overall performance of the system, and then thereby solving the technical problem that the existing multi-core scheduling algorithms cannot accurately determine a target processor for running a task to be executed.

It should be noted that the technical problem that the multi-core scheduling algorithm pays attention to is to select a next target task to be run and determine a target processor for running the target task. The multi-core processor task scheduling method provided by the embodiment of the present application mainly solves the technical problem of how to accurately determine the target processor for running the target task.

In the embodiment of the present application, all processors in the multi-core processor may be regarded as the available overall resources that can be scheduled collectively. In a specific embodiment, a target task to be executed, for example, a new task to be executed, is acquired or selected; and a target processor is selected from the multi-core processor based on the binding relationship information and priority information of the target task to be executed, and the target task is merely scheduled to the target processor, to run the target task on the target processor.

Optionally, in the embodiment of the present application, it is first determined, based on the binding relationship information of the target task, whether the target task needs to be run on a processor with a binding relationship, and it is then determined whether the target task has the binding relationship with which one or several processors in the multi-core processor.

In an optional embodiment, the selecting, based on the attribute information of the target task, the target processor from the multi-core processor, includes:

Step S302, determining, based on the binding relationship information, that there is a first processor having the binding relationship with the target task in the multi-core processor;

Step S304, comparing the priority of the target task with a priority of a current task of the first processor; and Step S306, in a case where the priority of the target task is higher than the priority of the current task and the first processor is a processor currently scheduling the target task, determining the first processor as the target processor.

Figure 3:
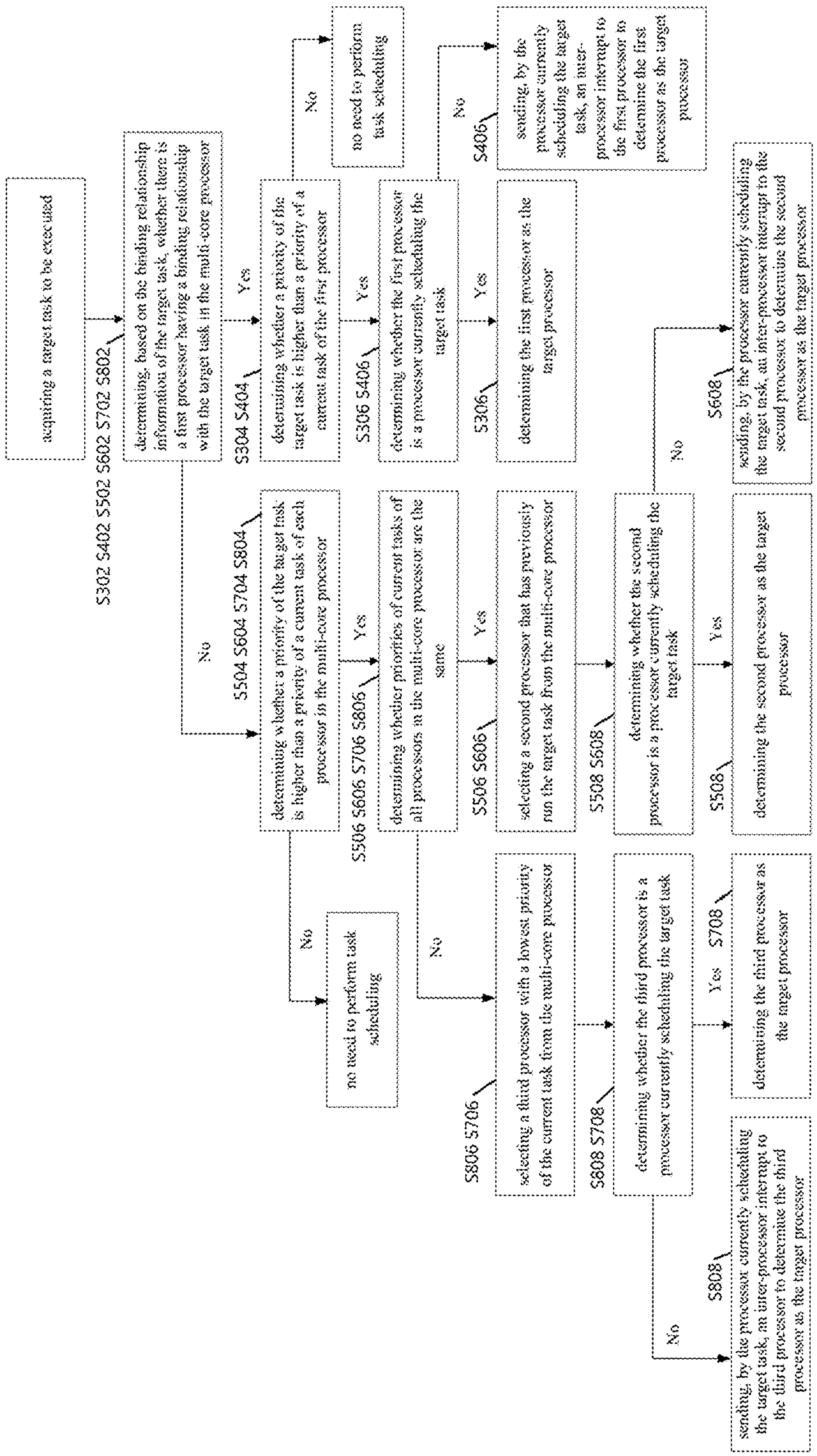
FIG. 3 is a flow chart of an optional multi-core processor task scheduling method according to an embodiment of the present application.

Optionally, in the embodiment of the present application, FIG. 3 is a flow chart of an optional multi-core processor task scheduling method according to an embodiment of the present application. As shown in FIG. 3, if it is determined, based on the binding relationship information, that there is the first processor having a binding relationship with the target task in the multi-core processor, that is, it indicates that the target task (i.e., a new task to be executed) has a binding relationship with the first processor, the priority of the target task is compared with the priority of the current task being run on the first processor. When the priority of the target task is higher than the priority of the current task, it is checked whether the first processor is a processor currently scheduling the target task. If the first processor is the processor currently scheduling the target task, the first processor is determined as the target processor, and a scheduler is executed on the first processor.

Optionally, in the embodiment of the present application, if the priority of the target task is lower than the priority of the current task being run on the first processor, it indicates that the target task cannot preempt the first processor having the binding relationship, and thus there is no need to execute task scheduling.

In an optional embodiment, the selecting, based on the attribute information of the target task, the target processor from the multi-core processor, includes:

Step S402, determining, based on the binding relationship information, that there is a first processor having the binding relationship with the target task in the multi-core processor;

Step S404, comparing the priority of the target task with a priority of a current task of the first processor; and Step S406, in a case where the priority of the target task is higher than the priority of the current task and the first processor is not a processor currently scheduling the target task, sending, by the processor currently scheduling the target task, an inter-processor interrupt to the first processor to determine the first processor as the target processor.

Optionally, in the embodiment of the present application, if it is determined, based on the binding relationship information, that there is the first processor having a binding relationship with the target task in the multi-core processor, that is, it indicates that the target task (i.e., a new task to be executed) has a binding relationship with the first processor, the priority of the target task is compared with the priority of the current task being run on the first processor.

Still as shown in FIG. 3, when the priority of the target task is higher than the priority of the current task, it is checked whether the first processor is a processor currently scheduling the target task. If the first processor is not the processor currently scheduling the target task, an inter-processor interrupt is sent to the first processor by the processor currently scheduling the target task, to determine the first processor as the target processor, and a scheduler is executed on the first processor.

In an optional embodiment, the selecting, based on the attribute information of the target task, the target processor from the multi-core processor, includes:

Step S502, determining, based on the binding relationship information, that there is no first processor having the binding relationship with the target task;

Step S504, comparing the priority of the target task with a priority of a current task of each processor in the multi-core processor;

Step S506, in a case where the priority of the target task is higher than the priority of the current task of each processor in the multi-core processor, and priorities of current tasks of all processors in the multi-core processor are the same, selecting a second processor that has previously run the target task from the multi-core processor; and Step S508, in a case where the second processor is a processor currently scheduling the target task, determining the second processor as the target processor.

Optionally, in the embodiment of the present application, still as shown in FIG. 3, if it is determined, based on the binding relationship information, that there is no first processor having a binding relationship with the target task in the multi-core processor, that is, it indicates that there is no processor having a binding relationship with the target task (i.e., a new task to be executed) in the multi-core processor, the priority of the target task is compared with the priority of a current task of each processor in the multi-core processor.

When the priority of the target task is higher than the priority of the current task of each processor in the multi-core processor, it is checked whether the priorities of the current tasks of all the processors in the multi-core processor are the same. If the priorities of the current tasks of all the processors are the same, a second processor that has run the target task is selected from the multi-core processor, for example, a processor that run the target task last time, a processor that run the target task the time before last time, etc.

After the second processor is selected, it is detected whether the processor currently scheduling the target task is the second processor. If the processor currently scheduling the target task is the second processor, the second processor is determined as the target processor, and a scheduler is executed on the second processor, which may significantly improve the affinity of the target task to the target processor in the multi-core processor.

Optionally, in the embodiment of the present application, if the priority of the target task is lower than the priority of the current task of each processor in the multi-core processor, it indicates that the target task cannot preempt the first processor having a binding relationship, and thus there is no need to execute task scheduling.

In an optional embodiment, the selecting, based on the attribute information of the target task, the target processor from the multi-core processor, includes:

Step S602, determining, based on the binding relationship information, that there is no first processor having the binding relationship with the target task;

Step S604, comparing the priority of the target task with a priority of a current task of each processor in the multi-core processor;

Step S606, in a case where the priority of the target task is higher than the priority of the current task of each processor in the multi-core processor, and priorities of current tasks of all processors in the multi-core processor are the same, selecting a second processor that has previously run the target task from the multi-core processor; and Step S608, in a case where the second processor is not a processor currently scheduling the target task, sending, by the processor currently scheduling the target task, an inter-processor interrupt to the second processor to determine the second processor as the target processor.

Optionally, in the embodiment of the present application, if it is determined, based on the binding relationship information, that there is no first processor having a binding relationship with the target task in the multi-core processor, that is, it indicates that there is no processor having a binding relationship with the target task (i.e., a new task to be executed) in the multi-core processor, the priority of the target task is compared with the priority of a current task of each processor in the multi-core processor.

When the priority of the target task is higher than the priority of the current task of each processor in the multi-core processor, it is checked whether the priorities of the current tasks of all the processors in the multi-core processor are the same. If the priorities of the current tasks of all the processors are the same, a second processor that has run the target task previously is selected from the multi-core processor, for example, a processor that run the target task last time, a processor that run the target task the time before last time, etc.

Still as shown in FIG. 3, after the second processor is selected, it is detected whether the processor currently scheduling the target task is the second processor. If the second processor is not the processor currently scheduling the target task, an inter-processor interrupt is sent to the second processor by the processor currently scheduling the target task, to determine the second processor as the target processor, and a scheduler is executed on the second processor, which may significantly improve the affinity of the target task to the target processor in the multi-core processor.

Optionally, in the embodiment of the present application, a ready queue, i.e., a task queue waiting to be executed by a CPU, may be set in advance for each processor in the multi-core processor, and a load balancing operation is performed periodically. Moreover, the identifier information of a CPU that has run the target task last time is recorded, and it tries to run the target task on the same CPU next time, which may significantly improve the CPU cache hit rate.

In an optional embodiment, the selecting, based on the attribute information of the target task, the target processor from the multi-core processor, includes:

Step S702, determining, based on the binding relationship information, that there is no first processor having the binding relationship with the target task;

Step S704, comparing the priority of the target task with a priority of a current task of each processor in the multi-core processor;

Step S706, in a case where the priority of the target task is higher than the priority of the current task of each processor in the multi-core processor and priorities of current tasks of all processors in the multi-core processor are different, selecting a third processor with a lowest priority of the current task from the multi-core processor; and Step S708, in a case where the third processor is a processor currently scheduling the target task, determining the third processor as the target processor.

Optionally, in the embodiment of the present application, if it is determined, based on the binding relationship information, that there is no first processor having a binding relationship with the target task in the multi-core processor, that is, it indicates that there is no processor having a binding relationship with the target task (i.e., a new task to be executed) in the multi-core processor, the priority of the target task is compared with the priority of a current task of each processor in the multi-core processor.

Still as shown in FIG. 3, when the priority of the target task is higher than the priority of the current task of each processor in the multi-core processor, it is checked whether the priorities of the current tasks of all the processors in the multi-core processor are the same. If the priorities of the current tasks of all the processors are different, a third processor with the lowest priority of the current task is selected from the multi-core processor.

After the third processor is selected, it is detected whether the processor currently scheduling the target task is the third processor. If the processor currently scheduling the target task is the third processor, the third processor is determined as the target processor, and a scheduler is executed on the third processing, which may significantly improve the affinity of the target task to the target processor in the multi-core processor.

Optionally, in the embodiment of the present application, if the priority of the target task is lower than the priority of the current task of each processor in the multi-core processor, it indicates that the target task cannot preempt the first processor having the binding relationship, and thus there is no need to execute task scheduling.

In an optional embodiment, the selecting, based on the attribute information of the target task, the target processor from the multi-core processor, includes:

Step S802, determining, based on the binding relationship information, that there is no first processor having the binding relationship with the target task;

Step S804, comparing the priority of the target task with a priority of a current task of each processor in the multi-core processor;

Step S806, in a case where the priority of the target task is higher than the priority of the current task of each processor in the multi-core processor and priorities of current tasks of all processors in the multi-core processor are different, selecting a third processor with a lowest priority of the current task from the multi-core processor; and Step S808, in a case where the third processor is not a processor currently scheduling the target task, sending, by the processor currently scheduling the target task, an inter-processor interrupt to the third processor to determine the third processor as the target processor.

Optionally, in the embodiment of the present application, if it is determined, based on the binding relationship information, that there is no first processor having a binding relationship with the target task in the multi-core processor, that is, it indicates that there is no processor having a binding relationship with the target task (i.e., a new task to be executed) in the multi-core processor, the priority of the target task is compared with the priority of a current task of each processor in the multi-core processor.

Still as shown in FIG. 3, when the priority of the target task is higher than the priority of the current task of each processor in the multi-core processor, it is checked whether the priorities of the current tasks of all the processors in the multi-core processor are the same. If the priorities of the current tasks of all the processors are different, a third processor with the lowest priority of the current task is selected from the multi-core processor.

After the third processor is selected, it is detected whether the processor currently scheduling the target task is the third processor. If the third processor is not the processor currently scheduling the target task, an inter-processor interrupt is sent to the third processor by the processor currently scheduling the target task, to determine the third processor as the target processor, and a scheduler is executed on the third processing, which may significantly improve the affinity of the target task to the target processor in the multi-core processor.

According to the solution of the present application, the multi-core CPU is used as a unified system resource for scheduling, the target processor is selected based on the binding relationship information and priority information of the target task, and scheduling only happens in a CPU that needs to perform scheduling, reducing the number of times of unnecessary scheduling of other CPUs. Thus, the CPU cache hit rate may be improved while taking load balancing into account, and the overall performance of the system may be improved.

It should be explained that, for the aforementioned respective method embodiment, for the sake of simple description, the method embodiment is expressed as a combination of a series of actions. However, those skilled in the art should know that the present application is not limited by the described action sequence, because according to the present application, some steps may be performed in other orders or simultaneously. Secondly, those skilled in the art should also know that the embodiments described in the specification are preferred embodiments, and the actions and modules involved are not necessary for the present application.

Through the description of the above embodiments, those skilled in the art may clearly understand that the method according to the above embodiments may be implemented by means of software and a necessary general-purpose hardware platform. Of course, the method according to the above embodiments may also be implemented by hardware. In many cases, the former is a better implementation. Based on such understanding, the essence of the technical solution of the present application or the part that makes a contribution over the prior art may be embodied in the form of a software product. The computer software product is stored in a non-volatile storage medium (such as a ROM/RAM, a disk, an optical disk), and contains several instructions to enable a terminal device (which may be a mobile phone, a computer, a server, or a network device, etc.) to execute the methods described in various embodiments of the present application.

Second Embodiment

Figure 4:
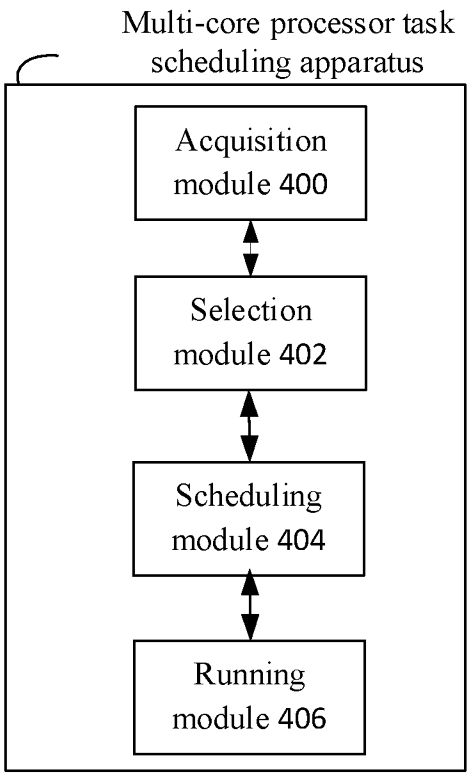
FIG. 4 is a schematic structural diagram of a multi-core processor task scheduling apparatus according to an embodiment of the present application.

According to an embodiment of the present application, an apparatus embodiment for implementing the above-mentioned multi-core processor task scheduling method is also provided. FIG. 4 is a schematic structural diagram of a multi-core processor task scheduling apparatus according to an embodiment of the present application. As shown in FIG. 4, the apparatus includes: an acquisition module 400, a selection module 402, a scheduling module 404 and a running module 406, wherein:

the acquisition module 400 is configured for acquiring a target task to be executed; the selection module 402 is configured for selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; the scheduling module 404 is configured for scheduling the target task to the target processor; and the running module 406 is configured for running the target task on the target processor.

In the embodiments of the present application, a target task to be executed is acquired; a target processor is selected from a multi-core processor based on attribute information of the target task, wherein the attribute information includes binding relationship information and priority information, the binding relationship information is used for describing whether the target task needs to be run on a processor having a binding relationship, and the priority information is used for describing a priority of the target task; the target task is scheduled to the target processor; and the target task is run on the target processor.

It is easy to notice that in the embodiments of the present application, all processors in the multi-core processor are regarded as the available overall resources that can be scheduled collectively, and the target processor is selected from the multi-core processor based on the binding relationship information and the priority information of the target task to be executed, and the target task is merely scheduled to the target processor, to run the target task on the target processor. Thus, the embodiments of the present application achieve the purpose of accurately determining the target processor for running the task to be executed, thereby achieving the technical effect of reducing the number of times of task scheduling of the multi-core processor and improving the overall performance of the system, and then thereby solving the technical problem that the existing multi-core scheduling algorithms cannot accurately determine a target processor for running a task to be executed.

It should be noted here that the acquisition module 400, the selection module 402, the scheduling module 404 and the running module 406 correspond to the steps S202 to S208 in the first embodiment, and the instances and application scenarios realized by the four modules and the corresponding steps are the same, but are not limited to the above content disclosed in the first embodiment. It should be noted that, as a part of the apparatus, the above modules may run in the computer terminal 10 provided in the first embodiment.

It should be noted that, for preferred implementations of this embodiment, reference may be made to the relevant description in the first method embodiment, and details are not repeated here.

Third Embodiment

According to an embodiment of the present application, an embodiment of a multi-core processor task scheduling device is also provided, and the multi-core processor task scheduling device may be any computing device in a group of computing devices.

The multi-core processor task scheduling device includes: a processor; and a memory, connected to the processor and configured for providing the processor with instructions to perform the following processing steps: acquiring a target task to be executed; selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; scheduling the target task to the target processor; and running the target task on the target processor.

In the embodiments of the present application, a target task to be executed is acquired; a target processor is selected from a multi-core processor based on attribute information of the target task, wherein the attribute information includes binding relationship information and priority information, the binding relationship information is used for describing whether the target task needs to be run on a processor having a binding relationship, and the priority information is used for describing a priority of the target task; the target task is scheduled to the target processor; and the target task is run on the target processor.

It is easy to notice that in the embodiments of the present application, all processors in the multi-core processor are regarded as the available overall resources that can be scheduled collectively, and the target processor is selected from the multi-core processor based on the binding relationship information and the priority information of the target task to be executed, and the target task is merely scheduled to the target processor, to run the target task on the target processor. Thus, the embodiments of the present application achieve the purpose of accurately determining the target processor for running the task to be executed, thereby achieving the technical effect of reducing the number of times of task scheduling of the multi-core processor and improving the overall performance of the system, and then thereby solving the technical problem that the existing multi-core scheduling algorithms cannot accurately determine a target processor for running a task to be executed.

It should be noted that, for preferred implementations of this embodiment, reference may be made to the relevant description in the first embodiment, and details are not repeated here.

Fourth Embodiment

According to an embodiment of the present application, an embodiment of a computer terminal is also provided, and the computer terminal may be any computer terminal device in a group of computer terminals. Optionally, in this embodiment, the foregoing computer terminal may also be replaced with a terminal device such as a mobile terminal and the like.

Optionally, in the embodiment, the computer terminal may be located in at least one network device among multiple network devices in a computer network.

In this embodiment, the computer terminal may execute program codes for implementing the following steps of the multi-core processor task scheduling method: acquiring a target task to be executed; selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; scheduling the target task to the target processor; and running the target task on the target processor.

Figure 5:
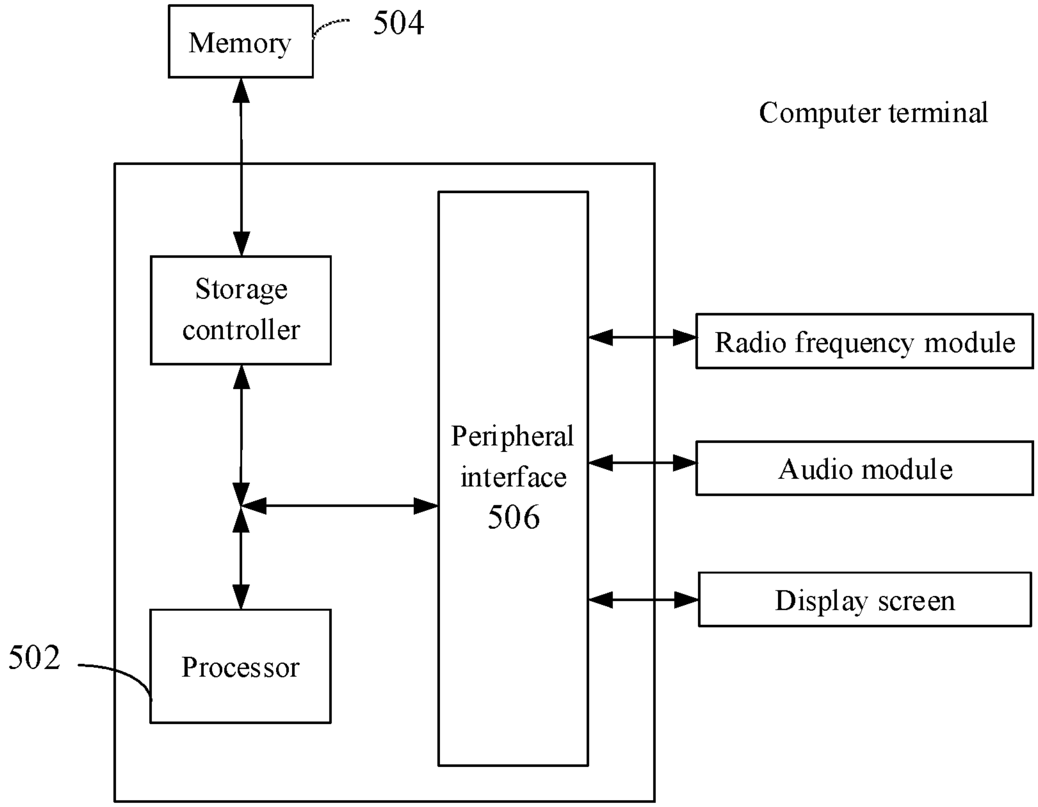
FIG. 5 is a structural block diagram of another computer terminal according to an embodiment of the present application.

Optionally, FIG. 5 is a structural block diagram of another computer terminal according to an embodiment of the present application. As shown in FIG. 5, the computer terminal may include: one or more (only one is shown in the figure) processors 502, a memory 504, and a peripheral interface 506.

The memory may be configured to store a software program and module, such as program instructions/modules corresponding to the multi-core processor task scheduling method and apparatus in the embodiments of the present application, and the processor executes various functional applications and data processing by running the software program and module stored in the memory, i.e., realizing the above-mentioned multi-core processor task scheduling method. The memory may include a high-speed random access memory, and may also include a non-volatile memory, such as one or more magnetic storage devices, a flash memory, or other non-volatile solid-state memory. In some instances, the memory may further include memories located remotely from the processor, and these remote memories may be connected to the computer terminal through a network. The instances of aforementioned network include, but are not limited to, the Internet, intranets, local area networks, mobile communication networks, and combinations thereof.

The processor may call the application program and information stored in the memory through a transmission apparatus, to perform the following steps: acquiring a target task to be executed; selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; scheduling the target task to the target processor; and running the target task on the target processor.

Optionally, the above-mentioned processor may also execute program codes for implementing the following steps: determining, based on the binding relationship information, that there is a first processor having the binding relationship with the target task in the multi-core processor; comparing the priority of the target task with a priority of a current task of the first processor; and in a case where the priority of the target task is higher than the priority of the current task and the first processor is a processor currently scheduling the target task, determining the first processor as the target processor.

Optionally, the above-mentioned processor may also execute program codes for implementing the following steps: determining, based on the binding relationship information, that there is a first processor having the binding relationship with the target task in the multi-core processor; comparing the priority of the target task with a priority of a current task of the first processor; and in a case where the priority of the target task is higher than the priority of the current task and the first processor is not a processor currently scheduling the target task, sending, by the processor currently scheduling the target task, an inter-processor interrupt to the first processor to determine the first processor as the target processor.

Optionally, the above-mentioned processor may also execute program codes for implementing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is a processor currently scheduling the target task, determining the second processor as the target processor.

Optionally, the above-mentioned processor may also execute program codes for implementing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is not a processor currently scheduling the target task, sending, by the processor currently scheduling the target task, an inter-processor interrupt to the second processor to determine the second processor as the target processor.

Optionally, the above-mentioned processor may also execute program codes for implementing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is a processor currently scheduling the target task, determining the third processor as the target processor.

Optionally, the above-mentioned processor may also execute program codes for implementing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is not a processor currently scheduling the target task, sending, by the processor currently scheduling the target task, an inter-processor interrupt to the third processor to determine the third processor as the target processor.

Using the embodiments of the present application, a solution of a multi-core processor task scheduling method is provided. A target task to be executed is acquired; a target processor is selected from a multi-core processor based on attribute information of the target task, wherein the attribute information includes binding relationship information and priority information, the binding relationship information is used for describing whether the target task needs to be run on a processor having a binding relationship, and the priority information is used for describing a priority of the target task; the target task is scheduled to the target processor; and the target task is run on the target processor.

It is easy to notice that in the embodiments of the present application, all processors in the multi-core processor are regarded as the available overall resources that can be scheduled collectively, and the target processor is selected from the multi-core processor based on the binding relationship information and the priority information of the target task to be executed, and the target task is merely scheduled to the target processor, to run the target task on the target processor. Thus, the embodiments of the present application achieve the purpose of accurately determining the target processor for running the task to be executed, thereby achieving the technical effect of reducing the number of times of task scheduling of the multi-core processor and improving the overall performance of the system, and then thereby solving the technical problem that the existing multi-core scheduling algorithms cannot accurately determine a target processor for running a task to be executed.

Those of ordinary skill in the art may understand that the structure shown in FIG. 5 is only schematic, and the computer terminal may also be a smart phone (such as an Android phone, an iOS phone, etc.), a tablet computer, a palm computer, and a Mobile Internet Device (MID), a PAD and other terminal devices. FIG. 5 does not limit the structure of the above-mentioned electronic devices. For example, the computer terminal may also include more or less components than those shown in FIG. 5 (such as a network interface, a display device, etc.), or have a configuration different from that shown in FIG. 5.

Those of ordinary skill in the art may understand that all or part of the steps in the various methods of the above-mentioned embodiments may be completed by instructing the hardware related to the terminal device through a program. The program may be stored in a computer-readable non-volatile storage medium, and the non-volatile storage medium may include: a flash disk, a Read-Only Memory (ROM), a Random Access Memory (RAM), a magnetic disk or an optical disk, and the like.

Fifth Embodiment

According to an embodiment of the present application, an embodiment of a non-volatile storage medium is also provided. Optionally, in this embodiment, the above-mentioned non-volatile storage medium may be configured to store the program codes executed for implementing the multi-core processor task scheduling method provided in the above first embodiment.

Optionally, in this embodiment, the above-mentioned non-volatile storage medium may be located in any computer terminal in a group of computer terminals in a computer network, or in any mobile terminal in a group of mobile terminals.

Optionally, in this embodiment, the non-volatile storage medium is configured to store program codes for performing the following steps: acquiring a target task to be executed; selecting, based on attribute information of the target task, a target processor from a multi-core processor, wherein the attribute information includes binding relationship information and priority information, the binding relationship information is used for describing whether the target task needs to be run on a processor having a binding relationship, and the priority information is used for describing a priority of the target task; scheduling the target task to the target processor; and running the target task on the target processor.

Optionally, in this embodiment, the non-volatile storage medium is configured to store program codes for performing the following steps: determining, based on the binding relationship information, that there is a first processor having the binding relationship with the target task in the multi-core processor; comparing the priority of the target task with a priority of a current task of the first processor; and in a case where the priority of the target task is higher than the priority of the current task and the first processor is a processor currently scheduling the target task, determining the first processor as the target processor.

Optionally, in this embodiment, the non-volatile storage medium is configured to store program codes for performing the following steps: determining, based on the binding relationship information, that there is a first processor having the binding relationship with the target task in the multi-core processor; comparing the priority of the target task with a priority of a current task of the first processor; and in a case where the priority of the target task is higher than the priority of the current task and the first processor is not a processor currently scheduling the target task, sending, by the processor currently scheduling the target task, an inter-processor interrupt to the first processor to determine the first processor as the target processor.

Optionally, in this embodiment, the non-volatile storage medium is configured to store program codes for performing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is a processor currently scheduling the target task, determining the second processor as the target processor.

Optionally, in this embodiment, the non-volatile storage medium is configured to store program codes for performing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is not a processor currently scheduling the target task, sending, by the processor currently scheduling the target task, an inter-processor interrupt to the second processor to determine the second processor as the target processor.

Optionally, in this embodiment, the non-volatile storage medium is configured to store program codes for performing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is a processor currently scheduling the target task, determining the third processor as the target processor.

Optionally, in the embodiment, the non-volatile storage medium is configured to store program codes for performing the following steps: determining, based on the binding relationship information, that there is no first processor having the binding relationship with the target task; comparing the priority of the target task with a priority of a current task of each processor in the multi-core processor; in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is not a processor currently scheduling the target task, sending, by the processor currently scheduling the target task, an inter-processor interrupt to the third processor to determine the third processor as the target processor.

The serial numbers of the above embodiments of the present application are only for description, and does not represent the strengths and weaknesses of the embodiments.

In the above embodiments of the present application, the description of each embodiment has its own emphases. A portion that is not described in detail in a certain embodiment may be referred to the relevant descriptions of other embodiments.

In the several embodiments provided by the present application, it should be understood that the disclosed technical contents may be implemented in other ways. The apparatus embodiments described above are only illustrative. For example, the division of units is only a logical function division, and there may be another division way in actual implementations. For example, multiple units or components may be combined or may be integrated into another system, or some features may be omitted, or not implemented. In another point, mutual coupling or direct coupling or communication connection shown or discussed may be implemented through some interfaces, and indirect coupling or communication connection of the units or modules may be implemented in electrical or other forms.

The units described as separate components may or may not be physically separated. The parts displayed as units may or may not be physical units, that is, they may be located in one place, or may also be distributed to multiple network units. Part or all of the units may be selected according to actual needs, to achieve the purpose of the solution of the embodiment.

In addition, the respective functional units in each embodiment of the present application may be integrated in one processing unit, or the respective units may exist separately physically, or two or more units may be integrated in one unit. The above integrated unit may be realized in the form of hardware or in the form of software function unit.

If the integrated unit is realized in the form of software function unit, and is sold or used as an independent product, it may be stored in a computer-readable non-volatile storage medium. Based on this understanding, the essence of the technical solution of the present application, or the part that makes a contribution over the prior art, or all or part of the technical solution may be embodied in the form of a software product. The computer software product is stored in a non-volatile storage medium, including several instructions to enable a computer device (which may be a personal computer, a server, or a network device, etc.) to perform all or part of the steps of the methods described in various embodiments of the present application. The aforementioned non-volatile storage medium includes: various media that may store program codes, such as U disk, Read-Only Memory (ROM), Random Access Memory (RAM), mobile hard disk, magnetic disk or optical disk, etc.

The above are only the preferred embodiments of the present application. It should be pointed out that for those of ordinary skill in the art, some improvements and modifications may also be made without departing from the principle of the present application. These improvements and modifications should also fall within the protection scope of the present application.

What is claimed is:

1. A multi-core processor task scheduling method, comprising:
- acquiring a target task to be executed;
- selecting, based on attribute information of the target task, a target processor that is a processor core from a multi-core processor, wherein the attribute information comprises binding relationship information and priority information, the binding relationship information is used for describing whether the target task needs to be run on a processor having a binding relationship with the target task, and the priority information is used for describing a priority of the target task;
- scheduling the target task to the target processor; and running the target task on the target processor,
- wherein the selecting, based on the attribute information of the target task, the target processor from the multi-core processor, comprises:
- determining, based on the binding relationship information, that there is a first processor having the binding relationship with the target task, in the multi-core processor;
- comparing the priority of the target task with a priority of a current task of the first processor; and
- in a case where the priority of the target task is higher than the priority of the current task and the first processor is a processor currently scheduling the target task, determining the first processor as the target processor.

2. The multi-core processor task scheduling method of claim 1, wherein the selecting, based on the attribute information of the target task, the target processor from the multi-core processor, comprises:
- determining, based on the binding relationship information, that there is a first processor having the binding relationship with the target task, in the multi-core processor;
- comparing the priority of the target task with a priority of a current task of the first processor; and
- in a case where the priority of the target task is higher than the priority of the current task and the first processor is not a processor currently scheduling the target task, sending, by the processor currently scheduling the target task, an inter-processor interrupt to the first processor to determine the first processor as the target processor.

3. The multi-core processor task scheduling method of claim 1, wherein the selecting, based on the attribute information of the target task, the target processor from the multi-core processor, comprises:
- determining, based on the binding relationship information, that there is no first processor having the binding relationship with the target task;
- comparing the priority of the target task with a priority of a current task of each processor in the multi-core processor;
- in a case where the priority of the target task is higher than the priority of the current task of each processor in the multi-core processor, and priorities of current tasks of all processors in the multi-core processor are the same, selecting a second processor that has previously run the target task from the multi-core processor; and
- in a case where the second processor is a processor currently scheduling the target task, determining the second processor as the target processor.

4. The multi-core processor task scheduling method of claim 1, wherein the selecting, based on the attribute information of the target task, the target processor from the multi-core processor, comprises:
- determining, based on the binding relationship information, that there is no first processor having the binding relationship with the target task;
- comparing the priority of the target task with a priority of a current task of each processor in the multi-core processor;
- in a case where the priority of the target task is higher than the priority of the current task of each processor in the multi-core processor, and priorities of current tasks of all processors in the multi-core processor are the same, selecting a second processor that has previously run the target task from the multi-core processor; and
- in a case where the second processor is not a processor currently scheduling the target task, sending, by the processor currently scheduling the target task, an inter-processor interrupt to the second processor to determine the second processor as the target processor.

5. The multi-core processor task scheduling method of claim 1, wherein the selecting, based on the attribute information of the target task, the target processor from the multi-core processor, comprises:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is a processor currently scheduling the target task, determining the third processor as the target processor.

6. The multi-core processor task scheduling method of claim 1, wherein the selecting, based on the attribute information of the target task, the target processor from the multi-core processor, comprises:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is not a processor currently scheduling the target task, sending, by the processor currently scheduling the target task, an inter-processor interrupt to the third processor to determine the third processor as the target processor.

7. A non-transitory storage medium, comprising a stored program, wherein the program, when run, controls a device where the non-transitory storage medium is located to perform processing steps of:

acquiring a target task to be executed;

selecting, based on attribute information of the target task, a target processor that is a processor core from a multi-core processor, wherein the attribute information comprises binding relationship information and priority information, the binding relationship information is used for describing whether the target task needs to be run on a processor having a binding relationship with the target task, and the priority information is used for describing a priority of the target task;

scheduling the target task to the target processor; and running the target task on the target processor, wherein the selecting, based on the attribute information of the target task, the target processor from the multi-core processor, comprises:

determining, based on the binding relationship information, that there is a first processor having the binding relationship with the target task, in the multi-core processor;

comparing the priority of the target task with a priority of a current task of the first processor; and in a case where the priority of the target task is higher than the priority of the current task and the first processor is a processor currently scheduling the target task, determining the first processor as the target processor.

8. The non-transitory storage medium of claim 7, wherein the program, when run, controls the device where the non-transitory storage medium is located to perform processing steps of:

determining, based on the binding relationship information, that there is a first processor having the binding relationship with the target task, in the multi-core processor;

comparing the priority of the target task with a priority of a current task of the first processor; and in a case where the priority of the target task is higher than the priority of the current task and the first processor is not a processor currently scheduling the target task, sending, by the processor currently scheduling the target task, an inter-processor interrupt to the first processor to determine the first processor as the target processor.

9. The non-transitory storage medium of claim 7, wherein the program, when run, controls the device where the non-transitory storage medium is located to perform processing steps of:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is a processor currently scheduling the target task, determining the second processor as the target processor.

10. The non-transitory storage medium of claim 7, wherein the program, when run, controls the device where the non-transitory storage medium is located to perform processing steps of:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is not a processor currently scheduling the target task, sending, by the processor currently scheduling the target task, an inter-processor interrupt to the second processor to determine the second processor as the target processor.

11. The non-transitory storage medium of claim 7, wherein the program, when run, controls the device where the non-transitory storage medium is located to perform processing steps of:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is a processor currently scheduling the target task, determining the third processor as the target processor.

12. A multi-core processor task scheduling device, comprising:

a processor; and a memory, connected to the processor and configured for providing the processor with instructions to perform processing steps of:

acquiring a target task to be executed;

selecting, based on attribute information of the target task, a target processor that is a processor core from a multi-core processor, wherein the attribute information comprises binding relationship information and priority information, the binding relationship information is used for describing whether the target task needs to be run on a processor having a binding relationship with the target task, and the priority information is used for describing a priority of the target task;

scheduling the target task to the target processor; and running the target task on the target processor, wherein the selecting, based on the attribute information of the target task, the target processor from the multi-core processor, comprises:

determining, based on the binding relationship information, that there is a first processor having the binding relationship with the target task, in the multi-core processor;

comparing the priority of the target task with a priority of a current task of the first processor; and in a case where the priority of the target task is higher than the priority of the current task and the first processor is a processor currently scheduling the target task, determining the first processor as the target processor.

13. The multi-core processor task scheduling device of claim 12, wherein the memory is further configured for providing the processor with instructions to perform processing steps of:

determining, based on the binding relationship information, that there is a first processor having the binding relationship with the target task, in the multi-core processor;

comparing the priority of the target task with a priority of a current task of the first processor; and in a case where the priority of the target task is higher than the priority of the current task and the first processor is not a processor currently scheduling the target task, sending, by the processor currently scheduling the target task, an inter-processor interrupt to the first processor to determine the first processor as the target processor.

14. The multi-core processor task scheduling device of claim 12, wherein the memory is further configured for providing the processor with instructions to perform processing steps of:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is a processor currently scheduling the target task, determining the second processor as the target processor.

15. The multi-core processor task scheduling device of claim 12, wherein the memory is further configured for providing the processor with instructions to perform processing steps of:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor, and priorities of current tasks of all processors in the multi-core processor are the same, selecting a second processor that has previously run the target task from the multi-core processor; and in a case where the second processor is not a processor currently scheduling the target task, sending, by the processor currently scheduling the target task, an inter-processor interrupt to the second processor to determine the second processor as the target processor.

16. The multi-core processor task scheduling device of claim 12, wherein the memory is further configured for providing the processor with instructions to perform processing steps of:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is a processor currently scheduling the target task, determining the third processor as the target processor.

17. The multi-core processor task scheduling device of claim 12, wherein the memory is further configured for providing the processor with instructions to perform processing steps of:

determining, based on the binding relationship information, that there is no first processor having the binding relationship with the target task;

comparing the priority of the target task with a priority of a current task of each processor in the multi-core processor;

in a case where the priority of the target task is higher than the priority of the current task of each processor in the multi-core processor and priorities of current tasks of all processors in the multi-core processor are different, selecting a third processor with a lowest priority of the current task from the multi-core processor; and in a case where the third processor is not a processor currently scheduling the target task, sending, by the processor currently scheduling the target task, an inter-processor interrupt to the third processor to determine the third processor as the target processor.

* * * * *